United States Patent [19]
Elliott

[11] Patent Number: 5,520,366
[45] Date of Patent: May 28, 1996

[54] RAPID PULSE DELIVERY DIAPHRAGM VALVE

[75] Inventor: Jeff Elliott, West Pennant Hills, Australia

[73] Assignee: Goyen Controls Co. Pty. Limited, Milperra, Australia

[21] Appl. No.: 50,468

[22] PCT Filed: Sep. 21, 1992

[86] PCT No.: PCT/AU92/00502

§ 371 Date: Aug. 12, 1993

§ 102(e) Date: Aug. 12, 1993

[87] PCT Pub. No.: WO93/06399

PCT Pub. Date: Apr. 1, 1993

[30] Foreign Application Priority Data

Sep. 19, 1991 [AU] Australia ............... PK8430

[51] Int. Cl.⁶ ................................. F16K 31/40
[52] U.S. Cl. ........................... 251/30.01; 251/29
[58] Field of Search .............. 251/30.01, 30.02, 251/30.03, 28, 29; 137/485, 487.5, 488, 489, 492, 492.5

[56] References Cited

U.S. PATENT DOCUMENTS

3,806,081  4/1974  Otto ................ 251/28 X
4,226,259  10/1980  Szekely et al. ......... 251/30.01 X
4,717,116  1/1988  Ishigaki ............... 251/30.03 X

*Primary Examiner*—Kevin Lee
*Attorney, Agent, or Firm*—Learman & McCulloch

[57] ABSTRACT

A pilot-operated diaphragm valve adapted to deliver a compressed air pulse from its outlet includes a valve top and valve trigger sub-assembly that cooperate to cycle a flexible diaphragm of the valve toward and away from a diaphragm seat by application of an electric solenoid or external pneumatic pulse applied to the valve trigger. The valve top and trigger sub-assembly enclose a reciprocable hollow plunger that normally is held against a seat at its lower end by a reciprocable solid plunger supported for sliding movement above the hollow plunger in a sealed tube and biased by a spring into engagement with the hollow plunger. Activation of the solenoid or external pneumatic signal pulse drives the solid plunger out of engagement with the hollow plunger which in turn unseats producing low pressure above the diaphragm. The low pressure unseats the diaphragm allowing a high energy pulse of air to escape past the diaphragm through the outlet. Deactivation of the solenoid causes the solid plunger, hollow plunger, and diaphragm to return to their seated positions to stop the flow of air through the outlet.

13 Claims, 5 Drawing Sheets

RAPID PULSE DELIVERY DIAPHRAGM VALVE

BACKGROUND

This invention related to pilot operated pneumatic, in other words compressed air, valves. It is particularly concerned with such pneumatic valves used for producing a very short duration, high volume flow pulse. Diaphragm valves of this type are particularly suited for use in duct collecting equipment where elongate filter bags on which dust is collected on the outside surfaces must be shocked periodically by air blasts released into the bags to dislodge the dust, the dust usually falling under gravity into a collection hopper. The dust bags and collection hopper are housed as an enclosed unit and provision is generally made to direct the pneumatic pulses into the enclosure via one end of a blow tube that has several outlets branching off, each downwardly directed into one upward facing mouth of one bag. The more quickly and fully the pneumatic valve opens, the greater is the shock effect produced in the air pulse for any particular air pressure applied to its inlet. Following the high energy pulse for dislodgement of the dust, the more quickly the valve closes the less the compressed air supply source is depleted. It is usual that many such valves are installed in conjunction with one enclosure and that they are operated in sequence and it is desirable for the overall effectiveness of the filtration process that the bags are shocked reasonably frequently. For operational economy it is desirable that the quantity of compressed air used is minimised.

The valve according to the present invention will be described with particular reference to the requirements pertinent to the dust collector application. Nonetheless, the invention has other applications where fluid flows are controlled for other purposes. For example, the valve would also be very effective where pressure pulse injection into silos, hoppers and the like is required to assist material flow by breaking up arching and bridging around downwardly tapering outflow regions. Description with reference to dust collector applications is not to be taken as a limitation to the broader applicability of the invention.

Diaphragm valves used predominantly for the dust collector applications tend to be generally "large" in valve manufactures' and users terminology, typically connectable to 20 mm to 75 mm nominal pipe sizes (¾ to 3 inches) with the principal preponderance of demand centred around the 25 to 50 mm (1 to 2 inch) sizes. Prior art valves used analogously to the proposed use of the valve of this invention have been developed over an approximately 30 year period to the state of advancement as descried in more detail later in the specification with reference to prior art valve shown in FIG. 5. The present invention concerns a further advancement of such valves that on a size for size comparison basis provide a significantly lower consumption of compressed air whilst providing at least as effective and more accurately controllable pressure pulse delivery.

SUMMARY OF THE INVENTION

The invention consists of a large pilot operated diaphragm valve for delivering a high energy short duration compressed air pressure pulse to a vessel connectable to an outlet port of said valve, the valve comprising a flexible diaphragm assembly and a pressure equalisation means across opposite faces of said diaphragm, the valve including a sub-assembly comprising a valve top and valve trigger;

the valve top comprising:
(a) a pilot reservoir opening from a first external surface of the valve top adapted for mating attachment to a receptive face of a body portion of the valve adapted to support the said flexible diaphragm assembly across the said face;
(b) a cavity opening from a second external surface of the valve top;
(c) a first fluid communication means providing a sole means connecting the pilot reservoir to the cavity;
(d) a second fluid communication means connecting the cavity to the atmosphere outside of the valve top;
(e) a hollow plunger adapted to occupy at least a portion of the cavity;
(f) an annular seat and a seat closure means operative to be closeable and openable by movement of the hollow plunger with respect to the cavity;
(g) a restricted fluid communications means between a pair of axially opposed end surfaces of the hollow plunger whilst in its operative inter-relationship within said sub-assembly; and
(h) a small fluid containment recess abutting each said end surface.

and the valve trigger comprising:
(i) an airtight covering abutting the second face and enclosing any portion of said hollow plunger protruding, but for the said covering, from the second face;
(j) a solid plunger adapted to slidingly move in the said covering, respectively into and out of a direct sealing contact with said hollow plunger, under the influence of a remotely applicable force capable of acting upon the said solid plunger;
(k) a restricted fluid communication means between a pair of axially opposed end surfaces of the solid plunger whilst contained in its operative inter-relationship with the said airtight covering; and
(l) a small clearance space adjacent one end of said solid plunger opposite to the end that abuts said fluid containment recess, adapted to enable the solid plunger to move under the influence of said force into said space out of contact with the hollow plunger to initiate an opening cycle of the diaphragm valve.

Preferable features, with discussion of their significance, are as follows:

The hollow plunger may have an axial length sized to occupy only partly the depth of the cavity. This arrangement enables an end of the plunger to extend outwardly beyond the plane of intersection of the cavity and the said second external surface from which the cavity opens in such a way that it can conveniently enter in a free sliding fit the air tight covering which in this case is also cylindrical in shape and the air tight covering and hollow plunger are diametrically sized relative to each other whereby the plunger is a free slidable fit in the covering.

The restricted fluid communication means between a pair of axially opposed end surfaces of the hollow plunger is preferably a carefully selected diametral clearance between the outside circumference of the hollow plunger, where, in use, it mates with and slides within the air tight covering housing it. This clearance is important and the hollow plunger does not have a sliding seal inter-relationship with the air tight covering. Without clearance, or equivalent, the hollow plunger could not function in the essential way that it does, namely to allow air pressure, during the time that the valve is in its normally closed periods, to equilibrate in its pressure on both circular opposite end faces of the hollow plunger. In this way, the valve trigger can be much more sensitive in its operation and the valve can be opened fully and closed much more quickly than can equivalently sized prior art valves. Alternatively to the clearance, the hollow plunger may be formed with an axial small hole or groove that connects the small containment recess at each end of the plunger when assembled. The diametral clearance is the preferable way of providing the restricted fluid communication between opposite ends of the plunger because, at least, it involves fewer manufacturing operations.

The airtight covering may be an upstanding hollow tubular protuberance aligned with the cavity and attached as an integral unit to the valve top from which it extends at right angles and preferably the solid plunger is positioned entirely within the covering during its operative range of movement. This is because an integrally mounted solenoid over the top of the airtight covering would provide the optimal opportunity for achieving the required rapid response and the right angled protrusion from the surface of the valve top is conducive to convenient installation of a solenoid. Furthermore, if the solid plunger has its movement range entirely within the protruding covering, then its mass can be minimised and the size of the solenoid required to move it quickly is minimised.

Preferably the restricted fluid communication means between opposite flat ends of the solid plunger comprises a diametral clearance between the outside periphery of the solid plunger and the inside diameter of the covering. Preferably also the small clearance space enabling the solid plunger to be moved away form the hollow plunger to initiate the opening of the valve has a volume substantially less than one quarter of the volume occupied by the solid plunger.

The above-mentioned remotely applicable force capable of being brought to act upon the solid plunger is preferably a magnetic force created by virtue of passing an electric currently through the solenoid coil surrounding the covering and the solid plunger comprises a magnetic material. This preference arises because of the optimal response time achievable by an electromagnetic solenoid mounted abutting the valve top. As an alternative the solid plunger or a mechanical equivalent of its may be caused to move by a pneumatically applied force transmitted from a location remote from the valve.

The small containment recess abutting each end of the hollow plunger preferably comprises an annular shaped volume defined by:

(i) a short axial distance by which the respective sear means at each end of the plunger protrudes relative to the surrounding respective end face of the plunger;
(ii) the exposed surface of the respective seat closing means; and
(iii) the circumferential peripheral surface of the cavity or covering housing the respective end of the plunger.

Preferably the above-mentioned first fluid communication means comprises a plurality of holes that intersect with the cavity to define a plurality of slot shaped entrances to the cavity, the total cross-sectional area of which exceeds the cross-sectional area of the opening defined by the opening form the cavity to the second fluid communication means connecting the cavity to atmosphere.

Preferably the second fluid communication means comprises a cross section not smaller than that of the cross-sectional area where it intersects with the cavity. This is important in providing the minimum impediment to pilot air escape when opening the valve. The air in the pilot reservoir, at the appropriate time in the valve opening cycle, needs to be able to escape past the opening in the cavity that leads via the exhaust tube to the atmosphere. It is desirable that the opening, by its size, be the design specified variable that determines the rate of escape of the air, rather than restrictions to flow, both "upstream" and "downstream" of that opening.

The seat closure means may comprise a circular tubular sharply edged protuberance upstanding from a flat floor of the cavity opposite its entry face and the seat closure means is a resilient washer carried on the end face of the hollow plunger that, upon assembly, enters the cavity. Whilst the arrangement would function if the seat were carried on the plunger and the opening were through the resilient washer afixed to the floor of the cavity, the preferred arrangement is vice versa because the opening size of the seat can be more precisely determined and maintained when machined in the metallic material such as aluminum preferred for the manufacture of the main cover. This preferred form is more likely to be manufacturable in a construction having the advantage of being robust in service, consistent in performance and readily maintainable.

The cavity may be formed to open from a flat face of the valve top parallel to that face from which the pilot reservoir opens. The alternative possibility of it opening from a face such as one at right angles, could give rise to difficulty in a case where it would be required to mount a solenoid coil over the valve trigger assembly if that assembly were projecting outwardly with insufficient clearance between it and a face of the valve top parallel to the face abutting the pilot reservoir. In the preferred embodiment shown in FIG. 1 as discussed in more detail below there is no such difficulty since the valve trigger assembly 62 projects at right angles form the face 46 (FIG. 3) clear of any surrounding potential impediment to assembly of a solenoid thereon.

BRIEF DESCRIPTION OF THE DRAWINGS

An embodiment of the valve according to the invention is now described by way of example with reference to the accompanying figures in which.

DETAILED DESCRIPTION

Figure 1:
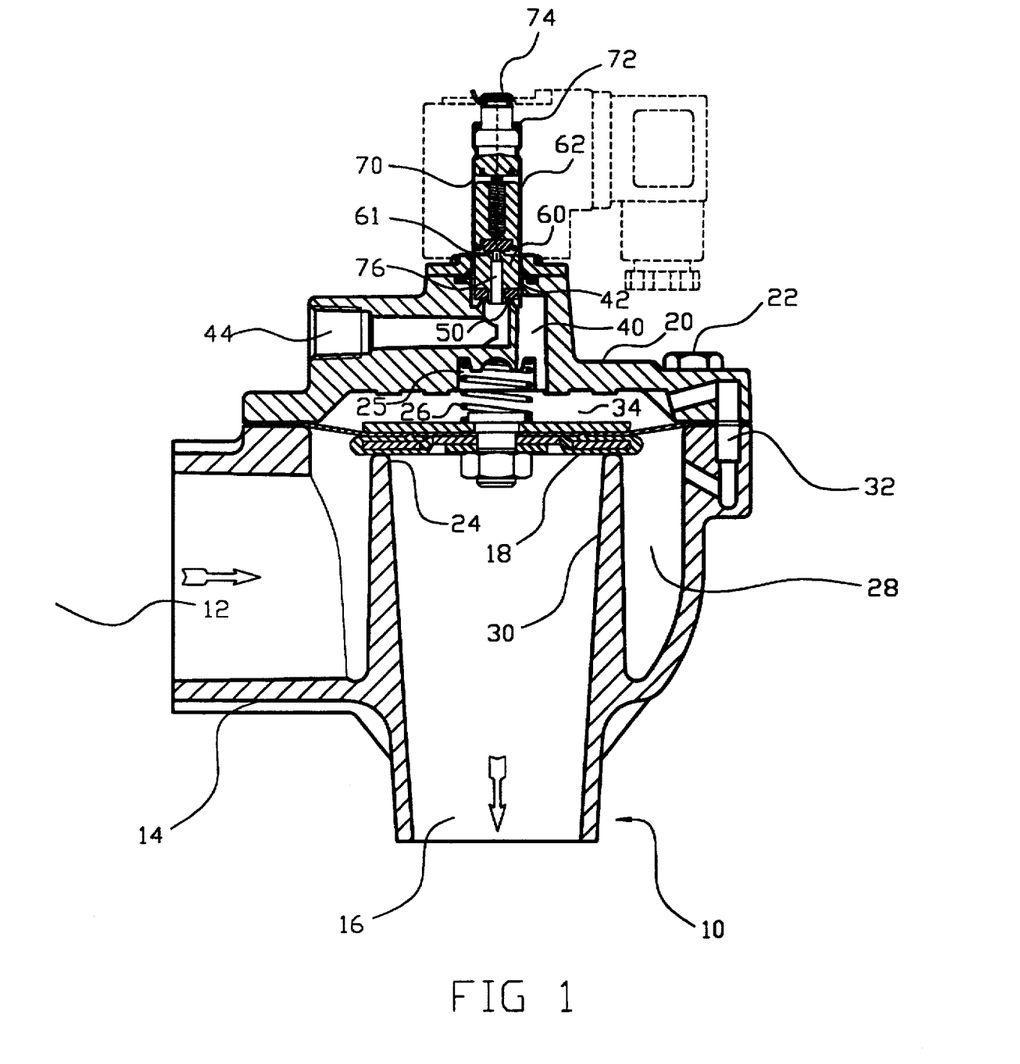
FIG. 1 is an upright cross-sectional view of a rapid response pilot actuated diaphragm valve according to the present invention.

The embodiment chosen to illustrate a valve 10 according to the present invention is depicted in FIG. 1. It is described generally proceeding from bottom to top of the valve using terms such as up, down, top, bottom, left and right merely to refer to the orientation as illustrated rather than any essential orientation in use. The valve 10 may be employed in any required orientation.

The valve 10 has an air inlet passage 12 entering the body 14 on its left hand side and an outlet passage 16 exiting the body from the bottom. In the valve a flexible diaphragm assembly 18 is positioned conventionally across an uppermost circular planar face of the body 10 and is sandwiched to that face by the attachment of a main cover 20 held to the body by any suitable fastening means, in this case 6 equispaced bolts 22. The diaphragm assembly 18 may include a conventional metallic plate reinforcement means about its centre and the assembly is biased downwardly against a circular first seat 24 by a compression spring 26. The inlet 12 extends into the valve body 14 to form an annular chamber 28 surrounding the tubular body portion 30 that terminates at its upper extremity at the seat 24.

A bleed tube 32 is provided between the upper and low surfaces of the diaphragm assembly 18 in the form of intersecting holes formed in the body 14, the main cover 20 and the flexible diaphragm assembly 18 so that, in use, air pressure applied to the inlet 12 acts equally on both upper and lower faces of the diaphragm assembly 18 when it is in its seated, lowermost, position closing the valve. The net force that can act downwardly on the diaphragm assembly when seated is much greater than that acting upwardly because of the much larger upward facing area of the diaphragm assembly on which the inlet air pressure can (downwardly) act as compared to the downward facing annular shaped area of the diaphragm surrounding the valve seat 24 upon which air pressure can act upwardly.

The bleed tube 32 is, or can be, much larger in cross section than the corresponding provision in prior art valves that necessarily have a restriction in the bleed tube for reasons to be described later. The reduced restriction in the bleed tube 32 of the valve according to the invention is a beneficial feature that contributes to the controlled quick pressure pulse sought. The bleed tube 32 alternatively may take the form of one or more holes in the annular portion of the flexible diaphragm assembly 18 radially inwardly of its periphery where it is sandwiched between the body and main cover and radially outwardly of the seat 24.

The main cover 20 is provided with a pilot reservoir 34 enclosing—when the main valve is shut—a quantity of compressed air strongly forcing the diaphragm assembly 18 against the seat 24. A housing 25 extending further upwardly in the main cover 20 provides a location for the upper end of the spring 26.

Figure 2A:
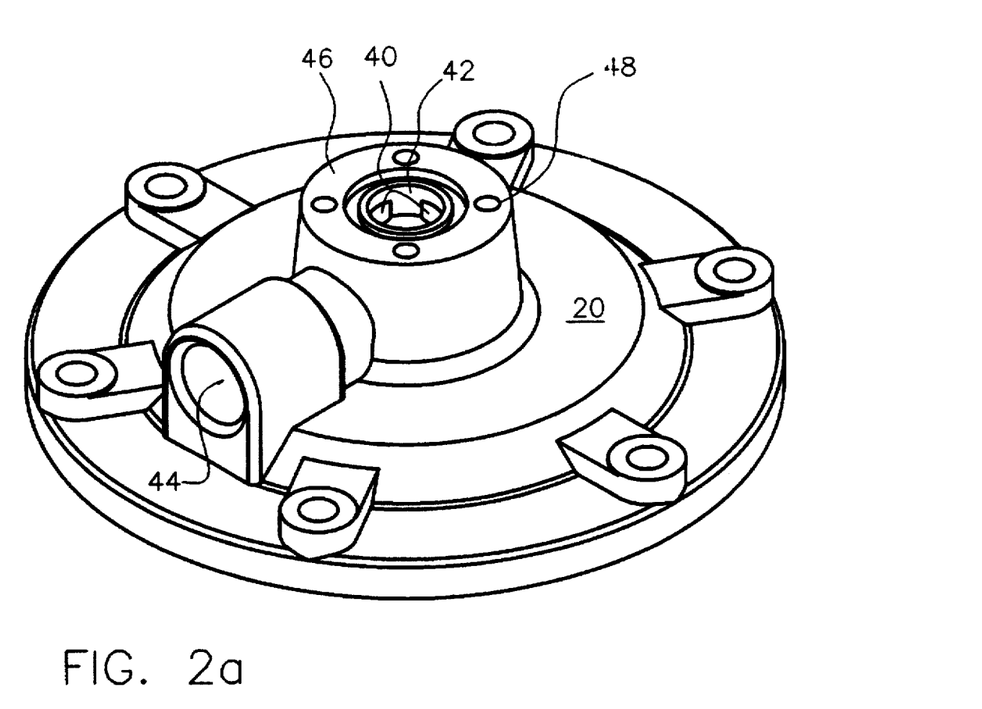
FIG. 2 is an upright perspective and cross-sectional view of a main cover included in the valve of FIG. 1, to a slightly enlarged scale.
Figure 2B:
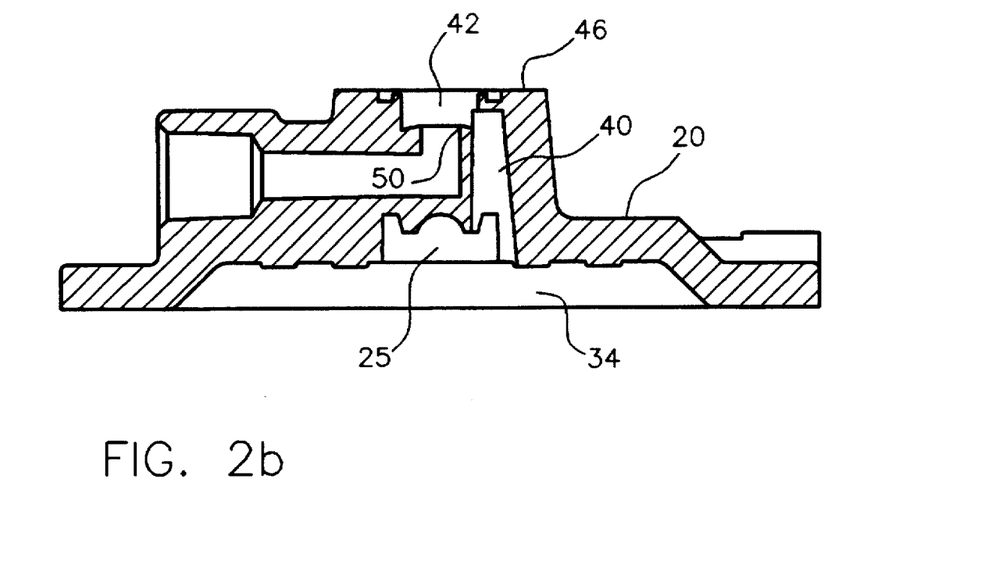

The main cover 20 is now further described by primary reference to the larger scale FIG. 2, using corresponding reference numerals to those in FIG. 1. The main cover 20 depicted in FIG. 2 provides:

(i) the pilot reservoir 34 for air pressure to act downwardly on the diaphragm assembly 18 (FIG. 1),
(ii) the central housing 25 to locate the compression spring 26 (FIG. 1),
(iii) three holes 40 (two equispaced circumferentially in additional to the one visible) putting the reservoir 34 into fluid flow communication with;
(iv) a cavity 42; and
(v) a tube 44 connecting the cavity 42 to the atmosphere outside of the valve (10).

The external form of the main cover 20 visible particularly in the perspective illustration included in FIG. 2 includes conventionally shaped prominences to adapt the internal features to (I) to (V) above to traditional metals and plastics forming techniques in a manner apparent at least to one involved with valve design and manufacture and therefore not requiring detailed description.

Figure 3:
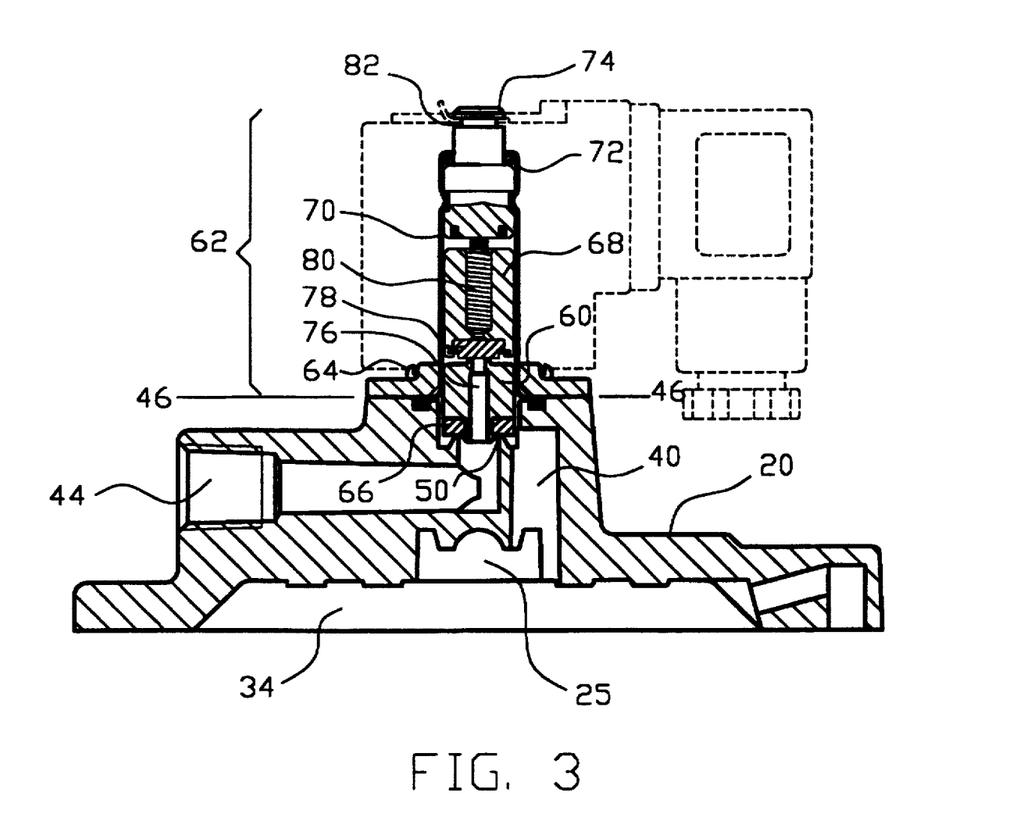
FIG. 3 is an upright cross-sectional view of the main cover and a valve trigger assembly included in the valve of FIG. 1 to a still more enlarged scale.

The cavity 42 is adapted to receive by insertion therein a hollow plunger (60) to be further described in relation to FIG. 3. With reference to both FIG. 2 and FIG. 3, a valve trigger assembly 62 is integrally retained to the uppermost flat face 46 of the main cover 20 by an annular ring held down by four bolts 64 entering the threaded holes 48 (FIG. 2). As more easily seen in the cross-sectional view of FIG. 2, the cavity 42 contains the second valve seat 50 defining a lower dividing line between the cavity 42 and the tube 44 leading to the outside atmosphere. The second valve seat 50 is contacted by the hollow plunger 60 (FIG. 3) that has at its lowest end an annular shaped resilient washer 66 capable of creating an airtight seal against the second valve seat 50. The second valve seat 50 may suitably be 6 to 7 mm diameter for a 40 mm nominal pipe size valve.

Both the hollow plunger 60 and an armature assembly 68 above it are freely slidable with slight clearance inside a tubular guide shell 70 that contains and comprises the several components making up the valve trigger assembly 62. Neither the plunger 60 nor armature 68 are airtightly sealed around their peripheral interface with the shell 70; thus, whilst the valve 10 is in its normally closed position, a sufficient although restricted path exists between the shell and the plunger and armature so that air pressure can equalise around all surfaces of the plunger and armature and up to the top of the shell 70. The top of the shell 70 is shaped with an inwardly turned edge to retain a sealing 'O' ring 72 against a stepped portion of an iron top 74. The iron top 74 is locked in place in the top end of the shell 70 by a radially inward deformation of a small portion of the wall of the shell 70 into a circumferential groove formed in the iron top. The shell accordingly is capable of holding without leakage a full supply air pressure and does contain such pressure whilst the valve is closed against it (typically in service up to about 1.25 p.s.i. of 860 kiloPascals (kPa)).

The downward facing area of the plunger 60 exposed to air pressure in the shell 70 when the plunger 60 is in its downward (closed) position is much greater than its upward facing area radially outward of the second valve seat 50. Thus, when the valve (10) is in equilibrium in use in its normally closed position the net force acting on plunger 60 is strongly downward. A bore 76 through the plunger is closed at its upper end by the armature 68 which has resilient washer 78 at its lower end to more tightly seal the board 76 when required. The upper portion of the armature 68 is made of a magnetic material such as soft iron or an authentic grade of stainless steel.

The armature 68 has a deep recess passing through most of its length to house a compression spring 80. The top of the spring 80 is seated against the lower face of the iron top 74. There is a small clearance space between the lower face of the iron top 74 and the upper surface of the armature 68 when the armature is in its lower position, that is, when the valve is closed. The clearance space is as small as possible and preferably has a volume less than and, more preferably substantially less than, one quarter of the volume occupied by the armature.

A conventional design of solenoid coil, of tubular shape (shown in phantom lines in FIGS. 1, 3, and 5) fits around the outside of the shell 70 and is retained thereon by a fastener such as a circlip, also illustrated, that slides into the groove 82 in the iron top 74.

With primary referent to FIGS. 1 and 3, the function of the valve 10 is now described. In the position illustrated in FIG. 1, the valve 10 is in its normally closed position. In this position, the flexible diaphragm assembly 18 is in its lowest position contacting and closing the first seat 24, so blocking the pressurised air at the valve inlet 12 from being delivered to the valve outlet 16.

Inlet air, under pressure, occupying the annular chamber 28 can flow through bleed tube 32 around the flexible diaphragm assembly 18 to occupy the reservoir 34, amongst other places. The reservoir 34 is connected by holes 40 to allow the air to flow to the spaces surrounding the hollow plunger 60 radially outward of the seat 50 (at the bottom end of the plunger 60) and of a third seat (61, FIG. 4) (at the top end of the plunger 60). At equillibrium with the valve closed, the hollow plunger is urged tightly against the seat 50 by a net downward force.

When the valve is closed the armature 68 assumes an equillibrium downward position in the shell 70 under the influence of air pressure acting from both above and below it and the force of the spring 80 acting downwardly as a consequence of being put into compression upon the assembly of the valve trigger assembly 62 to the remainder of the valve 10.

In order to trigger the valve 10 to direct a large volume pulse of short duration through the outlet into, for example, a blow tube connected to a number of dust collection filter bags requiring a reverse jet pulse to shake accumulated dust from them, an electric current of short duration is passed through the solenoid coil. The position of the solenoid coil in relation to the magnetic armature 68 is arranged so that the armature 68 is pulled upwardly against the spring 80, uncovering the third seat 61. Air under compression above the armature is displaced around the peripheral surface downwardly into the very small space above the hollow plunger and is exhausted with air under compression above the plunger 60 to atmosphere through the bore 76 into the tube 44. Only a very small volume of air needs to escape in this way before the net downward force on the plunger 60 reverses so that it moves quickly upward to make contact again between the seat 61 and the washer 78. The upward movement of the plunger 60 uncovers the second seat 50 and in view of its relatively large diameter a significantly large volume of compressed air escapes to atmosphere quickly from the holes 40 and the reservoir 34 to which they connect. The air compressed in the reservoir 34 can escape much more quickly than it can be replenished through the bleed tube 32 while the plunger 60 remains off the seat 50 and so a pressure differential is created across the diaphragm assembly 18 that results in a net positive upward force that lifts the diaphragm assembly 18 off the first seat 24, against the relatively small downward force of the spring 26.

As soon as the required air pressure pulse is delivered through the outlet 16, it is desirable that the first seat 24 be closed by the diaphragm assembly 18 as quickly as possible. The closure of the valve 10 proceeds in reverse order to the opening sequence, being initiated by interrupting the power supply to the solenoid. It is described further following a description now of the closes known prior art valve.

Figure 4:
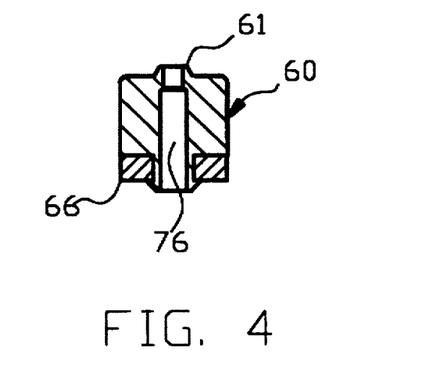
FIG. 4 is a further enlarged upright cross-sectional view of a plunger in the valve trigger assembly of FIGS. 1 and 3.
Figure 5:
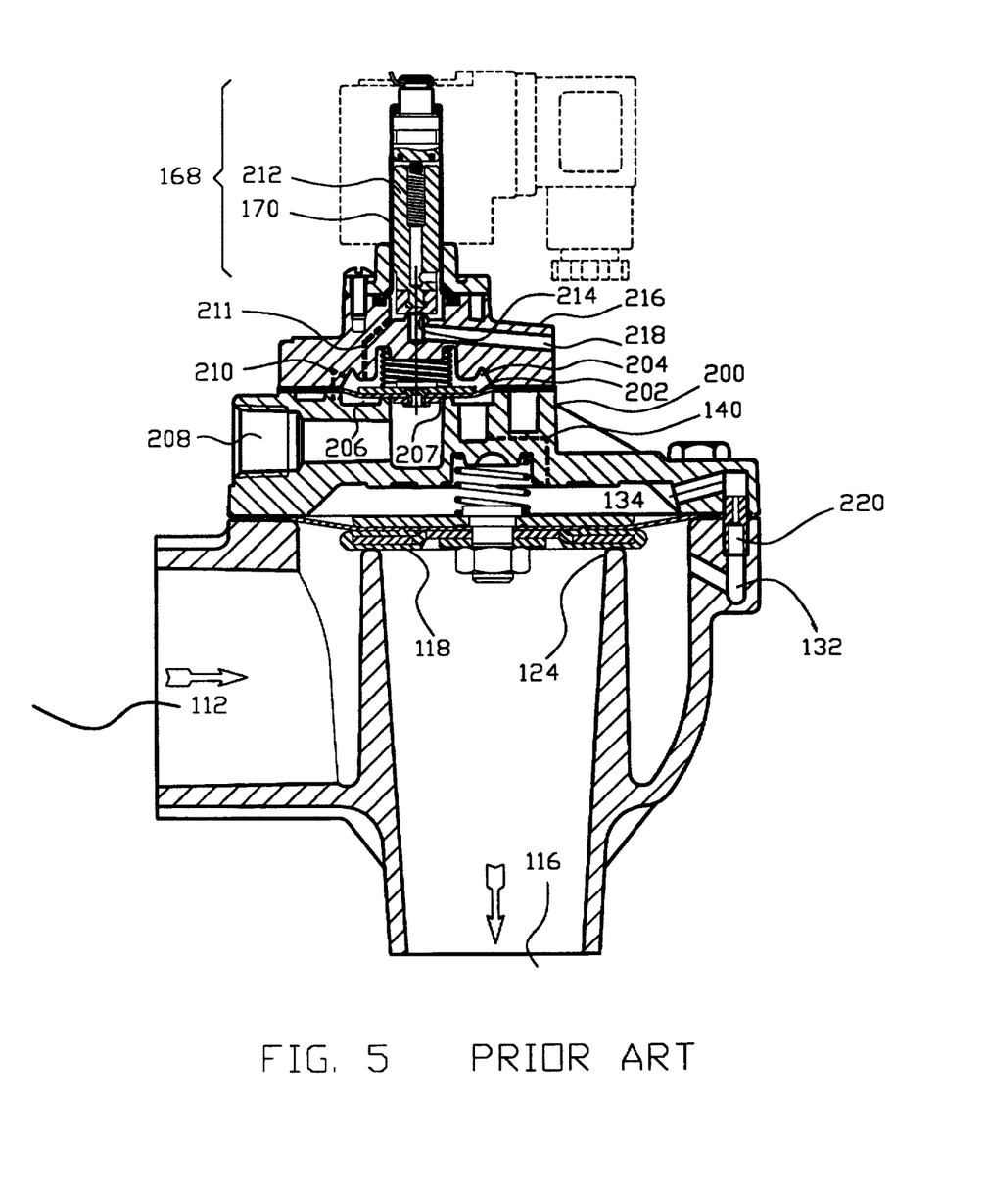
FIG. 5 is an upright cross-sectional partly schematic representation of a prior art commercially used large diaphragm valve of the same general type as the invention.

In describing the prior art valve shown in FIG. 5 the following system of reference numerals is followed to assist in distinguishing features between the prior art valve and the invention embodiment of FIGS. 1 to 4. In FIG. 5, three-digit reference numerals beginning with "1" have essentially identical counterparts, and the second two digits match those used, in FIGS. 1 to 4. In FIG. 5, wherein 3 digit reference numerals beginning with "2" are used the feature is different in some significant way from the invention.

With reference to FIG. 5, above the first diaphragm assembly is a valve top 200 that, unlike any embodiment according to the present invention, houses a second diaphragm assembly 202 that is abutted by a second pilot reservoir 204 of relatively large capacity above the second diaphragm. A second set of holes 140 depicted schematically as a heavy dotted line in the cross-section, upwardly connects the pilot reservoir 134 with a relatively large capacity inlet chamber 20 abutting the underside of the second diaphragm assembly 202. A large diameter seat 207 and pilot exhaust tube 208 (both typically about 9 mm diameter for a 40 mm nominal pipe size valve) lead respectively from the inlet chamber 206 to the atmosphere outside of the valve.

The second pilot reservoir 204 and inlet chamber 206 are interconnected by a second bleed tube 210 bypassing the second diaphragm assembly. The second bleed tube 210 serves the same purpose in relation to the functioning of the second diaphragm as the bleed tube 32 in relation to the diaphragm assembly 18 does in the valve shown in FIG. 1.

A third passage 211 (shown schematically as a dotted line) leads from the second pilot reservoir upward to join with a small chamber surrounding the lower end of an armature assembly 168 mounted in a guide tube 170 at the top of the valve, in a similar manner to that applicable in valves according to the invention. In the prior art valve the armature 212 itself is much longer, to the extent that it protrudes beyond the lower end of the guide tube 170 into a cavity recessed into the top of a second valve cover 214 that sandwiches the second diaphragm assembly 202 to a top face of the valve top 200.

The armature 212 has a resilient washer affixed to its bottom end that engages and seals a third seat 214 in the bottom of the chamber at the top of the second valve cover 216 when the armature is in its lowest position. The underside of the valve seat 214 leads though the body of the second valve cover to the surrounding atmosphere via a second pilot exhaust tube 218.

The prior art valve functions during an opening and closing cycle in a way analagous to the valve of the invention except that it is slower to complete one open and close cycle. A significant reason for this is that the prior art valve is much slower to reverse its intermediate phases of operation, namely to exhaust sufficient air form the relatively large second pilot reservoir 204 to enable the compressed air derived from the inlet through the bleed tubes 132 and 210 and the second set of holes 140 to provide a net force on the underside of the second diaphragm to exceed the downward forces form the second diaphragm spring plus the pressure differential.

This relatively large volume of air is exhausted through the small third seat and second pilot exhaust tube 218. The third seat 214 is necessarily small in this valve because if it were made larger it would lead to the net downward force on the armature being greater. A sufficient increase in the third seat diameter to effect any worthwhile air flow capacity to operate the valve faster would impose such a net downward force on the armature when downwards (assuming it were pilot air balanced as illustrated) as would lead to it being beyond the available solenoid power to open.

In the closing phase of the prior art valve's operation, the armature 212 first closes the third seat 214 causing air pressure in the second pilot reservoir 204 to build up to a point where the net force on the diaphragm 202 changes to being downward in direction and the second diaphragm closes the second seat 207. Air pressure is then able to build up in the pilot reservoir 134 until it too counterbalances then overcomes the pressure differential across the first diaphragm 118, so closing the diaphragm onto the seat.

It is noteworthy that the prior art valve requires a much more substantial restriction 220 in the bleed tube 132 than does the valve according to the invention. If the restriction 220 were not included in the prior art valve then the valve tends not to open (or does not open) on demand because the escape of air to atmosphere through the interconnected reservoirs and third seat keeps pace with the inflow through the bleed tube 132. Thus the pressure difference required to reverse the second diaphragm assembly 202 is not achieved so, consequentially, neither is the main diaphragm 118 able to lift of its seat 124 to open the valve.

In the valve of the invention, as exemplified in FIGS. 1 to 4, the bleed tube 32) can be relatively unrestricted, essentially because the hollow plunger is adapted by reason of its small mass and the relative size of the air escape paths, to lift off its seat 50 very quickly following the lift of the armature assembly 68. Once this has occurred, the required rapid rate of pressure drop-off in the recess 34 (functioning as the pilot reservoir for the first diaphragm assembly 18) can not be counteracted by too great an inflow of air passing the relatively unrestricted bleed tube 32. Hence the valve can open quickly as required. But the more important benefit of the relative lack of restriction of the bleed tube 32 in the valve of the invention is that the closure of the valve is completed:

(i) more quickly;
(ii) with a more accurate response reaction to the electrical change of state used to trigger the valve's open/close cycle; and
(iii) with significantly less wasted compressed air form the source.

With continued reference to FIGS. 1 to 4, during the closing part of the cycle, when the current supplied to the solenoid coil is stopped, the armature is able to close immediately onto the third seat 61 (FIG. 4). The downward force on the hollow plunger causes the underside of it into contact with the second seat 50. As soon as the second seat is closed the air pressure in holes 40 and reservoir 34 rises, being supplied by air entering through the bleed tube 32 such that the pressure differential acting across the diaphragm assembly 18 reverses causing the diaphragm to revert to its closed position against the first seat 24.

USES AND ADVANTAGES

The relative performance of the valve according to the invention and the closest prior art valve of the same general type is shown in FIGS. 6(a) and (b). In both parts of the figure the horizontal axis depicts time and the vertical axis pressure. The sinusoidal shaped curves represent an alternating current electrical input to the respective solenoids of each valve and are to the same time scale as the pressure versus time curves. The amplitude of the electrical current curves is to no particular scale. In each of FIGS. 6(a) and (b) is shown a second pressure versus time curve identified as R. The curves R show the change in supply pressure as a result of performing one open-close cycle of the valve. It is to be noted that, for the purpose of comparative testing, a fixed volume supply reservoir is used, prefilled to a specified initial pressure and not replenished during the test.

Figure 6:
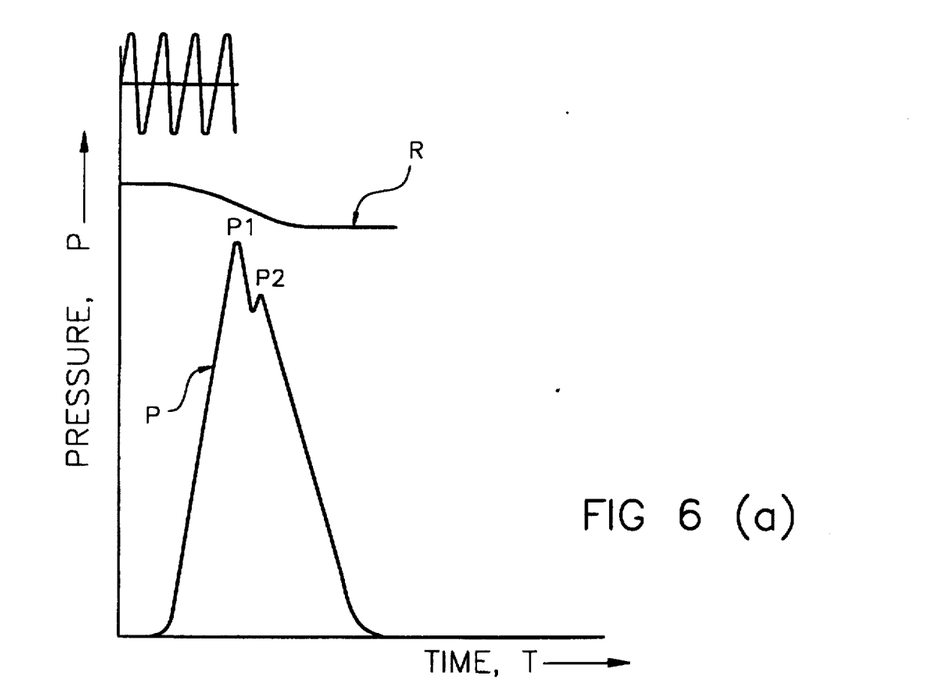
FIG. 6(a) is a graphical depiction of a pressure versus time characteristic performance of a valve according to the invention.
FIG. 6(b) is a graphical depiction to the same scale as FIG. 6(a) of the equivalent pressure versus time characteristic recorded for the prior art valve of the type shown in FIG. 5, that valve being of the same nominal pipe connection sizes as the valve that produced the characteristic performance as shown in FIG. 6(a).

With reference to FIGS. 6(a) an 6(b) the origin O of the pressure and time axes represents the valve being closed and an electrical signla given at time T=0 to open the valve. The valve outlet is connected for the purpose of comparative tests to a long closed pipe of similar capacity to one as would be used in a dust collector as a blow tube. A pressure measuring transducer is fixed inside the end of the pipe distant from the valve outlet and its output is connected to an oscilloscope. On the oscilloscope traces P & Q as depicted in FIG. 6, a time lag is evident before the pressure rises, resulting in part from a mechanical delay whilst the previously described sequentially identifiable steps in the valve opening occur.

The rise time to the measured peak pressure is a function of the volume downstream of the valve to be brought up to the pressure and is partly dependent upon the nominal size of the valve. In the case of FIG. 6(a) (the valve of the invention) the pressure peak is identified as P1. After the valve main seat closes that is a rapid reduction of pressure to about 90% of the peak when a second minor pressure peak P2 is recorded. The pressure then falls away quickly to that existing at the closed equilibrium condition of the valve. The main diaphragm assembly remains open until peak P2.

In the case of FIG. 6(b), the first pressure peak is identified as Q1 but in this case three further minor peaks Q2, Q3 and Q4, each some 10% below the preceding one, may be recorded before the pressure falls to equilibrium. In this case the main diaphragm assembly remains open until peak Q4.

The valve of the invention provides considerable benefits in minimising the waste of compressed air in the supplying system. The after peaks are believed to have very little or no role in improving the dislodging ability of the first pressure peak. The areas underneath the respective curves representing air consumption show the significant saving able to be gained by using the valve of the invention.

I claim:

1. A pilot operated diaphragm valve for delivering a high energy short duration compressed air pressure pulse to an outlet port adapted for connection a vessel, said valve comprising a flexible diaphragm assembly and pressure equalization means across opposite faces of said diaphragm, said valve including a sub-assembly comprising a valve top and a valve trigger, said valve top comprising:

(a) a pilot reservoir opening from a first external surface of said valve top and adapted for mating attachment to a receptive face of a body portion of said valve adapted to support said flexible diaphragm assembly across said receptive face;

(b) a cavity opening from a second external surface of said valve top;

(c) first fluid communication means providing sole means connecting said pilot reservoir to said cavity;

(d) second fluid communication means connecting said cavity to atmosphere externally of said valve top;

(e) a hollow plunger occupying at least a portion of the cavity;

(f) an annular seat and associated seat closure means operative to be closeable and openable by movement of said hollow plunger with respect to said cavity;

(g) a restricted fluid communication path extending between a pair of axially opposed end surfaces of said hollow plunger when in its operative inter-relationship within said sub-assembly; and (h) a fluid containment recess provided at each of said end surfaces of said hollow plunger, said valve trigger comprising:

(i) an airtight covering abutting said second external surface and enclosing any portion of said hollow plunger protruding from said second external surface;

(j) a solid plunger having axially opposite ends and slideably supported within said covering to move one of said ends of said solid plunger into and out of a direct sealing contact with said hollow plunger in response to application of an external force upon said solid plunger;

(k) restricted fluid communication means between said solid plunger and said covering communicating with said ends of said solid plunger; and (l) a clearance space adjacent the other of said ends of said solid plunger of sufficient size to enable said solid plunger to move under the influence of said external force into said space out of contact with said hollow plunger to initial an opening cycle of said diaphragm valve.

2. The valve of claim 1 wherein said cavity has a predetermined depth and said hollow plunger has an axial length that is relatively greater than said depth of said cavity.

3. The valve of claim 1 or 2 wherein said restricted fluid communication means comprises diametrical clearance between the outside circumference of said hollow plunger and said cover.

4. The valve of claim 1 wherein said airtight covering comprises an upstanding hollow tubular protuberance aligned with said cavity and attached as an integral unit to said valve top and extending normal to said first external surface.

5. The valve of claim 1 wherein said solid plunger is positioned entirely within said cover during its operative range of movement.

6. The valve of claim 1 wherein said clearance space has a volume substantially less than one quarter of the volume occupied by the said plunger.

7. The valve of claim 1 wherein said solid plunger is made of magnetically permeable material and said force comprises a magnetic force applied to said solid plunger by a solenoid coil encircling the covering.

8. The valve of claim 1 wherein said fluid containment recesses at each end of said hollow plunger comprise annular volumes defined by an end face and conical side of a protruding seat at each of said ends of said hollow plunger and the associated surfaces of said cavity and said cover adjacent said hollow plunger ends, respectively.

9. The valve of claim 1 wherein said first fluid communication means comprises a plurality of holes that intersect said cavity to define a plurality of slotted entrances to said cavity, said holes having a total cross-sectional area which is relatively greater than that provided by said second communication means.

10. The valve of claim 1 wherein said second fluid communication means comprises an opening having a cross-sectional area that is of minimum in size at the intersection of said opening and said cavity.

11. The valve of claim 1 wherein said seat closure means comprises a circular tubular sharply edged protuberance upstanding from a flat floor of said cavity and said annular seat comprises a resilient washer carried on the end face of said hollow plunger adjacent said seat closure means.

12. The valve of claim 1 wherein said first external surface comprises a flat face and said second external surface comprises a flat face that is parallel to said flat face of said first external surface.

13. A valve top and trigger assembly for a pilot operated diaphragm valve, said assembly comprising:

a valve top having a first mounting surface adapted for mating attachment to a receptive face of body of the valve to capture a flexible diaphragm assembly of the valve therebetween in position across the face of the body; a pilot reservoir extending into said valve top from said first mounting surface; said valve top having a second surface spaced from said first surface and a city extending into said valve top from said second surface; a first fluid port extending between said pilot reservoir and said cavity to establish fluid communication therebetween; a second fluid port extending from said cavity to atmosphere outside of said valve top; an annular seat formed at a junction between said cavity and said fluid port; a hollow plunger having axially opposite first and second ends supported for axial sliding movement within said cavity and including a seal provided on said first end adjacent said seat for movement with said hollow plunger into and out of seating engagement with said seat to open and close said second fluid port; a bore extending though said hollow plunger between said opposite ends thereof and communicating at said first end with said second flow port; and a valve trigger assembly including an airtight tube having an open end in sealed engagement with said first mounting surface of said valve top in fluid communication with said cavity and extending axially therefrom to an opposite sealed end of said tube; a solid plunger having axially opposite ends slideably supported within said tube with one of said ends arranged adjacent said second end of said hollow plunger and provided with a seal for movement into and out of sealing engagement with said second end of said hollow plunger in response to application of external force on said solid plunger thereby to close and open, respectively, said bore of said hollow plunger; a restricted fluid flow passage communicating between said opposite ends of said solid plunger; ad an axial clearance between the other of said ends of said solid plunger and said sealed end of said tube of sufficient size to enable said solid plunger to move into said clearance under the influence of said external force and out of said sealed engagement with said hollow plunger.

* * * * *

UNITED STATES PATENT AND TRADEMARK OFFICE
CERTIFICATE OF CORRECTION

PATENT NO. : 5,520,366
DATED     : May 28, 1996
INVENTOR(S) : Jeff Elliott

It is certified that error appears in the above-indentified patent and that said Letters Patent is hereby corrected as shown below:

Column 3, line 46, change "sear" to --seat--; line 58, change "form" to -- from --.

Column 9, line 63, change "signla" to -- signal --.
Column 10, line 33, after "connection" insert -- to --.
Column 12, line 16, change "city" to -- cavity --; line 46, change "ad" to -- and --.

Signed and Sealed this

Tenth Day of December, 1996

Attest:

BRUCE LEHMAN

*Attesting Officer*     *Commissioner of Patents and Trademarks*